(12) United States Patent
Hikiri et al.

(10) Patent No.: US 10,252,623 B2
(45) Date of Patent: Apr. 9, 2019

(54) CHARGE/DISCHARGE SYSTEM

(71) Applicant: VOLVO TRUCK CORPORATION, Gothenburg (SE)

(72) Inventors: Kunihiko Hikiri, Saitama (JP); Takayuki Tsuchiya, Saitama (JP)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 14/442,150

(22) PCT Filed: Nov. 12, 2012

(86) PCT No.: PCT/JP2012/079251
§ 371 (c)(1),
(2) Date: May 12, 2015

(87) PCT Pub. No.: WO2014/073106
PCT Pub. Date: May 15, 2014

(65) Prior Publication Data
US 2015/0343909 A1 Dec. 3, 2015

(51) Int. Cl.
*B60L 11/08* (2006.01)
*B60L 11/18* (2006.01)
*B60L 11/14* (2006.01)
*B60W 10/08* (2006.01)
*B60W 10/26* (2006.01)
(Continued)

(52) U.S. Cl.
CPC ............... *B60L 11/08* (2013.01); *B60K 6/48* (2013.01); *B60L 1/003* (2013.01); *B60L 3/00* (2013.01); *B60L 11/005* (2013.01); *B60L 11/14* (2013.01); *B60L 11/18* (2013.01); *B60L 11/1812* (2013.01); *B60L 11/1861* (2013.01); *B60L 11/1862* (2013.01); *B60W 10/08* (2013.01); *B60W 10/26* (2013.01); *B60W 20/00* (2013.01);
(Continued)

(58) Field of Classification Search
CPC ............ B60L 11/08; B60L 11/00; B60L 11/18
USPC .......................................................... 318/139
See application file for complete search history.

(56) References Cited

U.S. PATENT DOCUMENTS 7,242,159 B2 * 7/2007 Ishikawa ................ B60K 6/365
318/139
7,402,982 B2 * 7/2008 Ito .......................... B60L 3/0046
104/287
(Continued)

FOREIGN PATENT DOCUMENTS

EP 1914139 A1 4/2008
JP 2004312926 A 11/2004
(Continued)

*Primary Examiner* — Kawing Chan
(74) *Attorney, Agent, or Firm* — Laurence A. Greenberg; Werner H. Stemer; Ralph E. Locher

(57) ABSTRACT

A charge/discharge system includes first and second electric chargers that supplies electric power to a motor generator and charges electric power generated by the motor generator, an electric power converter that complementarily performs charging/discharging between the first and second electric chargers, and a controller. The controller controls the electric power converter based on charging conditions of the first and second electric chargers such that electric power charged in the first electric charger is charged in the second electric charger, or electric power charged in the second electric charger is charged in the first electric charger.

5 Claims, 3 Drawing Sheets

(51) Int. Cl.
  *B60L 1/00*     (2006.01)
  *B60L 11/00*    (2006.01)
  *B60K 6/48*     (2007.10)
  *H02J 7/14*     (2006.01)
  *B60L 3/00*     (2019.01)
  *B60W 20/00*    (2016.01)

(52) U.S. Cl.
  CPC ......... *H02J 7/1423* (2013.01); *B60L 2210/12* (2013.01); *B60L 2210/14* (2013.01); *B60L 2250/26* (2013.01); *Y02T 10/6221* (2013.01); *Y02T 10/70* (2013.01); *Y02T 10/7005* (2013.01); *Y02T 10/705* (2013.01); *Y02T 10/7022* (2013.01); *Y02T 10/7044* (2013.01); *Y02T 10/7077* (2013.01); *Y02T 10/7225* (2013.01); *Y02T 10/7233* (2013.01); *Y02T 10/92* (2013.01)

(56) References Cited

U.S. PATENT DOCUMENTS

| | | | |
|---|---|---|---|
| 2006/0061307 A1* | 3/2006 | Donnelly | B60L 7/06 318/108 |
| 2006/0250929 A1 | 11/2006 | Ishikawa et al. | |
| 2009/0160247 A1 | 6/2009 | Nakamura et al. | |
| 2009/0167217 A1 | 7/2009 | Soma et al. | |
| 2011/0006723 A1* | 1/2011 | Yamakawa | B60K 6/445 318/812 |
| 2011/0221400 A1 | 9/2011 | Takizawa et al. | |
| 2011/0227341 A1* | 9/2011 | Rouis | F02N 11/04 290/31 |
| 2011/0285206 A1 | 11/2011 | Sato et al. | |
| 2012/0072066 A1 | 3/2012 | Kato et al. | |
| 2015/0210173 A1* | 7/2015 | Funabashi | B60L 11/1809 307/10.1 |
| 2015/0336466 A1* | 11/2015 | Hikiri | B60L 1/003 320/109 |
| 2016/0039306 A1* | 2/2016 | Okamura | H02J 7/345 701/22 |
| 2016/0046203 A1* | 2/2016 | Okamura | B60L 3/0046 701/22 |
| 2016/0082844 A1* | 3/2016 | King | H02M 3/158 307/10.1 |

FOREIGN PATENT DOCUMENTS

| | | |
|---|---|---|
| JP | 2005160154 A | 6/2005 |
| JP | 2008035670 A | 2/2008 |
| JP | 2010273428 A | 12/2010 |

* cited by examiner

CHARGE/DISCHARGE SYSTEM

TECHNICAL FIELD

This invention relates to a charge/discharge system that charges or discharges electric energy.

BACKGROUND ART

As a driving power source of a vehicle and the like, a battery is used to supply electric power to an electric motor. As a battery, for example, a secondary battery such as a lead storage battery and a lithium ion battery is employed. In addition to the battery, an apparatus capable of charging or discharging electric energy using an electric double-layer capacitor and the like is also known in the art.

Although the battery has a large storable capacity, its service lifespan is shortened when the charging/discharging is performed very frequently or in a deep cycle. In comparison, the capacitor is resistant to such frequent charging/discharging or a deep cycle and has a long service lifespan. However, the capacitor has a small storable capacity. In this manner, characteristics are different between the battery and the capacitor. Therefore, if both the battery and the capacitors are mounted together, it is necessary to perform a control in consideration of each characteristic.

In JP 2008-035670 A, there is disclosed a technique of guaranteeing an electric charging capacity of an electric charging mechanism having output performance superior to others in a vehicle provided with a plurality of electric charging mechanisms including both a battery and a capacitor.

SUMMARY OF INVENTION

The service lifespan of the battery is shortened when the charging/discharging is performed with high frequency and high output power or in a deep cycle. Therefore, it is preferable that such a burden of charging/discharging be shared with the capacitor. Meanwhile, in the prior art, since the charging/discharging is performed by switching to any one of the battery or the capacitor, it is difficult to say that the charging/discharging is efficiently performed.

In view of the aforementioned problems, it is therefore an object of this invention to provide a charge/discharge system, comprising a plurality of electric chargers such as a battery or a capacitor having different load or charge/discharge characteristics, by which energy efficiency can be improved.

According to an aspect of this invention, there is provided a charge/discharge system comprising: a motor generator that serves as a driving power source for driving a vehicle and performs electric power generation using power of the vehicle; a first electric charger that supplies electric power to the motor generator and charges electric power generated by the motor generator; a second electric charger different from the first electric charger; an electric power converter that complementarily performs charging/discharging between the first and second electric chargers; and a controller that controls operations of the motor generator and the electric power converter, wherein the controller controls the electric power converter based on at least one of charging conditions of the first and second electric chargers such that electric power charged in the first electric charger is charged in the second electric charger, or the electric power charged in the second electric charger is charged in the first electric charger.

The foregoing and additional features and characteristics of this disclosure will become more apparent from the following detailed description considered with the reference to the accompanying drawings.

DESCRIPTION OF EMBODIMENTS

Figure 1:
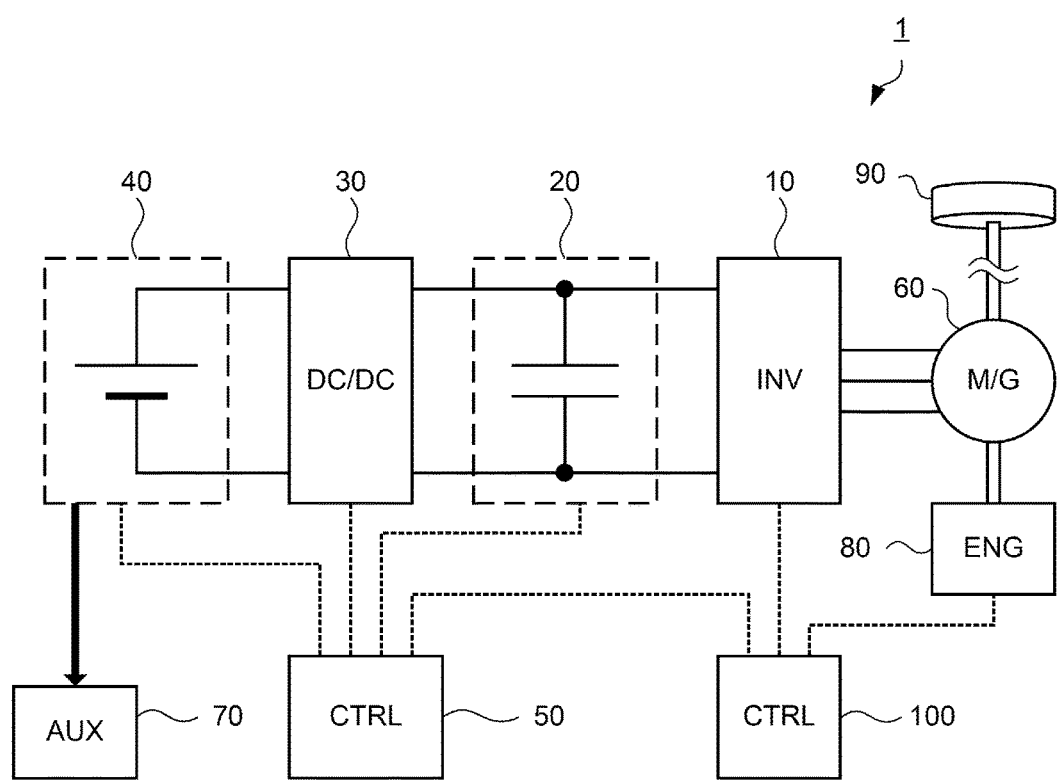
FIG. 1 is an explanatory diagram illustrating a vehicle having a charge/discharge system according to an embodiment of this invention.

FIG. 1 is an explanatory diagram illustrating a vehicle having a charge/discharge system 1 according to an embodiment of this invention.

The charge/discharge system 1 comprises an inverter 10, a capacitor 20, an electric power converter 30, a battery 40, a controller 50, a controller 100, and a motor generator 60.

A capacitor 20 (first electric charger) includes, for example, an electric double-layer capacitor for charging or discharging electric power. The battery 40 (second electric charger) includes, for example, a lithium ion secondary battery for charging or discharging electric power.

The capacitor 20 and the battery 40 supply the charged electric power to the motor generator 60 through the inverter 10. In addition, the electric power generated by the motor generator 60 is charged through the inverter 10. The inverter 10 performs AC-DC conversion between the capacitor 20, the battery 40, and the motor generator 60.

The electric power converter 30 includes, for example, a DC/DC converter and performs charging from the capacitor 20 to the battery 40 by boosting/dropping a voltage between the capacitor 20 and the battery 40. Alternatively, the electric power converter 30 performs charging from the battery 40 to the capacitor 20.

Electric accessories 70 are connected to the battery 40, so that the battery 40 supplies electric power to the electric accessories 70. The electric accessories 70 include a pump of an air conditioner or a cooler circuit, a radiator fan, and other electrically driven units.

The motor generator 60 (electric motor and generator) serves as a vehicle driving power source to rotate the driving wheels 90. In addition, the motor generator 60 serves as a generator to recover regenerative power when a vehicle is decelerated. The engine 80 serves as a vehicle driving power source solely or together with the motor generator 60. In addition, the engine 80 may drive the motor generator 60 to allow the motor generator 60 to generate electric power.

The controller 50 detects a state-of-charge (SOC) of the capacitor 20 and the battery 40. In addition, the controller 50 controls operations of the electric power converter 30. The controller 100 controls operations of the inverter 10 and the engine 80.

The controller 100 supplies the electric power charged in the capacitor 20 to the motor generator 60 through the inverter 10 to start a vehicle when the vehicle is requested to start from a stop state.

The controller 50 supplies the electric power charged in the battery 40 to the capacitor 20 through the electric power converter 30 when the electric power charged in the capacitor 20 is consumed. The controller 100 drives the motor generator 60 using this electric power. In this case, since the controller 100 operates the engine 80, this may be called "hybrid traveling" in which both the driving force of the engine 80 and the driving force of the motor generator 60 are used in the traveling.

Then, when deceleration of a vehicle is requested, the controller 100 drives the motor generator 60 as a generator, and the generated electric power is charged in the capacitor 20 through the inverter 10. In this case, when the capacitor 20 is fully charged, the controller 50 may perform control such that the electric power generated by the motor generator 60 is charged in the battery 40 through the electric power converter 30.

Next, a description will be made for the operation of the charge/discharge system configured in this manner.

The battery 40 is a lithium ion secondary battery. The service lifespan of the battery 40 is significantly shortened if the charging/discharging is performed with high frequency and high output power or in a deep cycle. Therefore, it is necessary to perform control such that such charging/discharging is avoided. The capacitor 20 is an electric double-layer capacitor. Although the capacitor 20 has a charging capacity smaller than that of the battery 40, it is resistant to reduction of the service lifespan caused by charging/discharging performed with high frequency and high output power or in a deep cycle.

Due to such a characteristic, it is preferable that the electric power charged in the capacitor 20 be used when high electric power is supplied to the motor generator 60 within a short time, such as a vehicle start, and the like. Meanwhile, since the electric power storable in the capacitor 20 is limited, it is preferable that a mechanism capable of appropriately using the electric power charged in the battery 40 be provided.

In this manner, by performing an electric power charging/discharging control suitable for each characteristic of the capacitor 20 and the battery 40, it is possible to improve energy efficiency without shortening the service lifespan of the battery 40, and thus improve fuel efficiency of a vehicle.

In the charge/discharge system 1 configured as illustrated in FIG. 1, the controller 100 performs control regarding whether the motor generator 60 is used in the driving or whether the motor generator 60 is used to generate electric power based on a vehicle condition. The controller 50 controls the electric power converter 30 such that the charging/discharging is complementarily performed between the capacitor 20 and the battery 40.

The controller 100 also controls the operation of the engine 80 as well as the driving and the electric power generation of the motor generator 60 based on, for example, a driver's request for acceleration or deceleration, a vehicle speed, and a state-of-charge (SOC) of the capacitor 20.

The controller 50 controls whether the charging is performed from the capacitor 20 to the battery 40 or whether the charging is performed from the battery 40 to the capacitor 20 based on the SOC of the capacitor 20 and the SOC of the battery 40 as described below.

Figure 2A:
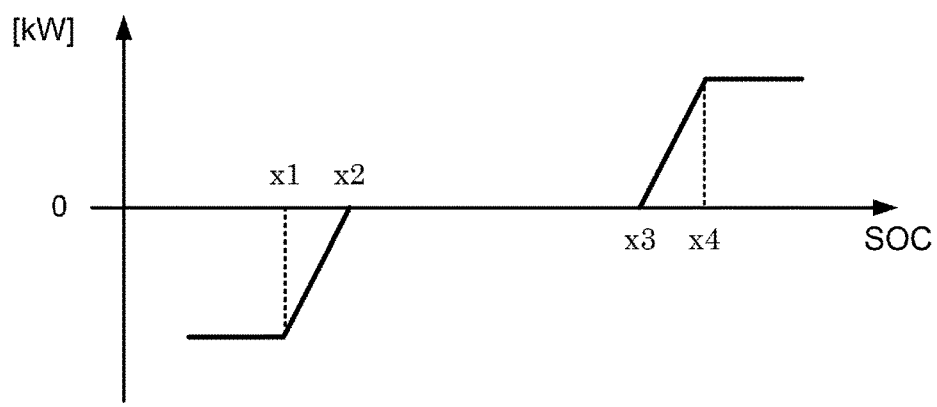
FIG. 2A is an explanatory diagram illustrating an exemplary charge/discharge map of a capacitor according to an embodiment of this invention.
Figure 2B:
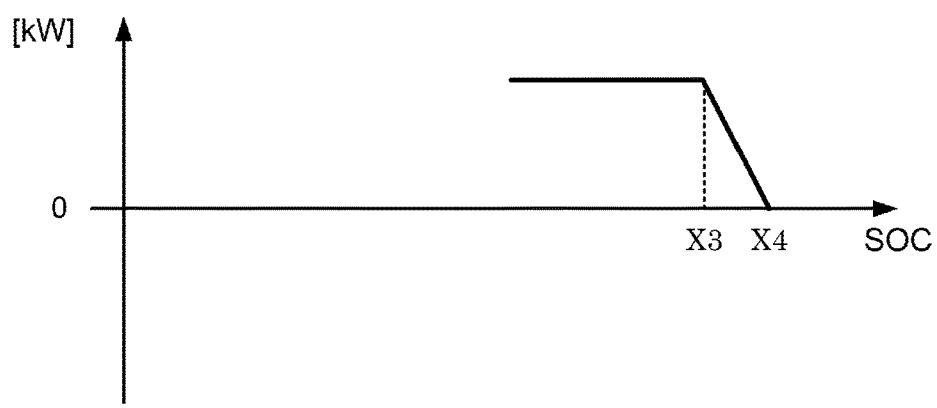
FIG. 2B is an explanatory diagram illustrating an exemplary charge/discharge map of a battery according to an embodiment of this invention.
Figure 2C:
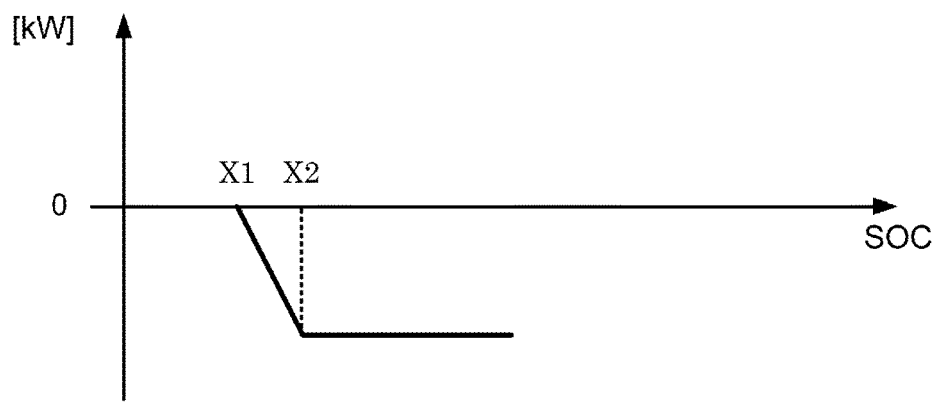
FIG. 2C is an explanatory diagram illustrating an exemplary charge/discharge map of a battery according to an embodiment of this invention.

FIGS. 2A to 2C are explanatory diagrams illustrating exemplary charge/discharge maps of the controller 50 according to an embodiment of this invention. FIG. 2A is a charge/discharge map of the capacitor 20, and FIGS. 2B and 2C are charge/discharge maps of the battery 40. The charge/discharge maps of the FIGS. 2A to 2C are used in the control of the controller 50.

The controller 50 computes the SOC of the capacitor 20 by obtaining a voltage of the capacitor 20. Similarly, the controller 50 computes the SOC of the battery 40 by obtaining voltage and current values of the battery 40.

The controller 50 controls the charging/discharging of the capacitor 20 and the battery 40 based on the computed SOC of the capacitor 20, the SOC of the battery 40, and the charge/discharge map of FIG. 2.

FIG. 2A illustrates a charge/discharge map of the capacitor 20. Referring to this charge/discharge map, if the SOC of the capacitor 20 is higher than a predetermined value x3, the positive output power, that is, the electric power charged in the capacitor 20 is output to the battery 40 through the electric power converter 30. In comparison, if the SOC of the capacitor 20 is lower than a predetermined value x2, the negative output power, that is, the electric power output from the battery 40 is charged in the capacitor 20 through the electric power converter 30.

It is noted that this charge/discharge map of the capacitor 20 is set such that the output power increases as the SOC increases from a predetermined value x3 to a predetermined value x4 which is greater than the value x3, and the output power reaches its maximum as the SOC reaches the predetermined value x4. This setting is to prevent an abrupt change of the charge/discharge electric power between the capacitor 20 and the battery 40 caused by a change of the SOC and maintain a constant slope.

Similarly, the charge/discharge map of the capacitor 20 is set such that the input power increases as the SOC decreases from a predetermined value x2 to a predetermined value x1 smaller than the value x2, and the input power reaches its maximum as the SOC reaches the predetermined value x1.

FIGS. 2B and 2C illustrate charge/discharge maps of the battery. Referring to this charge/discharge maps, the positive output power is restricted if the SOC of the battery 40 is higher than a predetermined value X4. That is, the charging from the capacitor 20 to the battery 40 is restricted. In comparison, if the SOC of the battery 40 is lower than a predetermined value X1, the negative output power is restricted. That is, the charging from the battery 40 to the capacitor 20 is restricted.

It is noted that, similar to the charge/discharge map of the capacitor 20, in order to prevent an abrupt change of the charge/discharge electric power between the capacitor 20 and the battery 40 caused by a change of the SOC, the charge/discharge map of FIG. 2B is set such that the output power decreases as the SOC increases from a predetermined value X3 to a predetermined value X4 greater than the value X3, and the output is not performed as the SOC reaches the predetermined value X4, that is, the charging from the capacitor 20 to the battery 40 is not performed.

Similarly, referring to FIG. 2C, the charge/discharge map is set such that the negative output power decreases as the SOC decreases from a predetermined value X2 to a predetermined value X1 smaller than the value X2, and the output is not performed as the SOC reaches the predetermined value X1, that is, the charging from the battery 40 to the capacitor 20 is not performed.

The upper limitation of the charge/discharge amount in the charge/discharge maps is set as maximum output power of the electric power converter 30.

Next, a description will be made for the operation of the charge/discharge system 1 in a vehicle configured in this manner.

Figure 3:
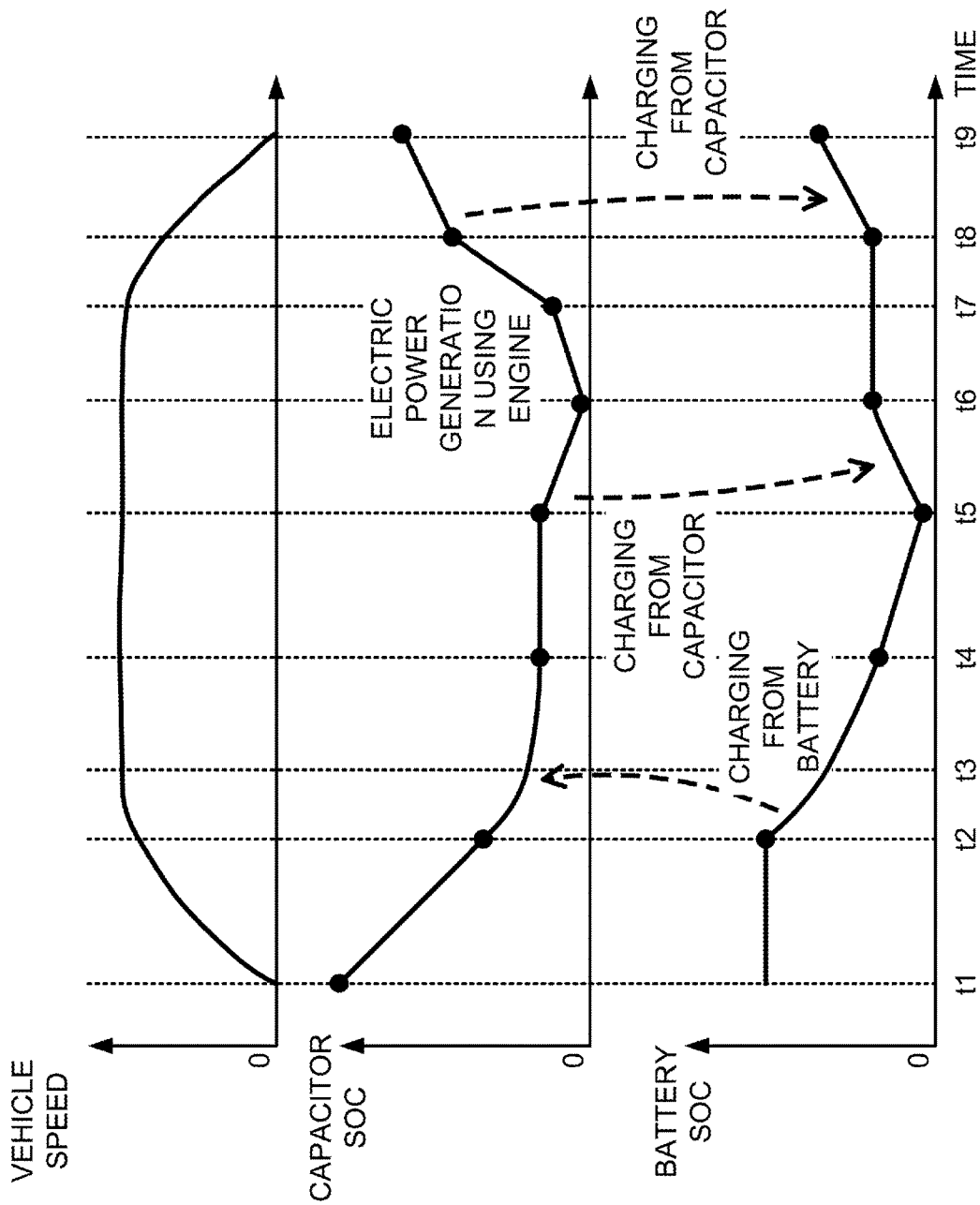
FIG. 3 is an explanatory diagram illustrating state-of-charge (SOC) variations of a capacitor and a battery in relation to a driving condition in a vehicle having a charge/discharge system according to an embodiment of this invention.

FIG. 3 is an explanatory diagram illustrating the driving condition and the state-of-charges (SOCs) of each of the capacitor 20 and the battery 40 in a vehicle having the charge/discharge system according to an embodiment of this invention.

FIG. 3 is a diagram illustrating a series of vehicle conditions in which a vehicle restarts from a stop state, travels for a certain period of time, and then stops after deceleration.

If a start request is received from a driver while a vehicle stops, the controller 100 performs control for starting the vehicle (timing t1). In this case, the vehicle starts by driving the motor generator 60 using the electric power charged in the capacitor 20 without driving the engine 80.

As the vehicle starts, a vehicle speed increases, and the electric power charged in the capacitor 20 is consumed by the motor generator 60, so that the SOC of the capacitor 20 gradually decreases.

When the SOC of the capacitor 20 is equal to or lower than the value x2 (timing t2) in the charge/discharge map of FIG. 2A, the controller 50 controls the electric power converter 30 to perform charging from the battery 40 to the capacitor 20. As a result, as electric power supplied to the motor generator 60, the electric power charged in the battery 40 as well as the capacitor 20 can be used. It is noted that, in this case, since the electric power charged from the battery 40 to the capacitor 20 matches the electric power supplied from the capacitor 20 to the motor generator 60, this is equivalent to a control of driving the motor generator 60 using the electric power of the battery 40.

Then, the controller 100 performs driving by operating the engine 80 as well as the motor generator 60 based on an acceleration request from a driver, a vehicle speed, and the like (timing t3). For example, the driving is performed using the driving forces of both the motor generator 60 and the engine 80 or only using the driving force of the engine 80.

In the example of FIG. 3, at the timing t3, the vehicle speed enters a normal travel condition, in which a vehicle speed becomes approximately constant, from the acceleration condition. At this timing t3, the operation of the engine 80 starts, and the vehicle travels using the driving forces of both the motor generator 60 and the engine 80. Then, at the timing t4, the vehicle travels only using the driving force of the engine 80 by stopping the operation of the motor generator 60.

While the operation of the motor generator 60 stops, the electric power charged in the capacitor 20 is not consumed. However, the electric power charged in the battery 40 is supplied to the electric accessories 70. Therefore, the SOC of the battery 40 gradually decreases.

When the SOC of the battery 40 is lower than a determination threshold value (not shown) (timing t5), the controller 50 performs charging from the capacitor 20 to the battery 40 by controlling the electric power converter 30. As a result, by charging the battery 40 using the electric power charged in the capacitor 20 and supplying it to the electric accessories 70, it is possible to increase a capacity dischargeable from the battery 40. In addition, in this case, since the electric power charged from the capacitor 20 to the battery 40 matches the electric power supplied from the battery 40 to the electric accessories 70, this is equivalent to a control of driving the electric accessories 70 using the electric power of the capacitor 20.

The SOC of the capacitor 20 decreases as the electric power is supplied to the battery 40. Then, if the SOC of the capacitor 20 is lower than a predetermined value (timing t6), the controller 100 performs charging to the capacitor 20 by generating electric power from the motor generator 60 by virtue of the driving force of the engine 80. It is noted that, in this case, the supply of the electric power from the capacitor 20 to the battery 40 stops as necessary.

Then, deceleration is instructed from a driver, for example, by depressing a brake pedal and the like (timing t7). As the deceleration is detected, the controller 100 causes the motor generator 60 to serve as a generator, so that the motor generator 60 generates electric power by virtue of rotation of the driving wheel 90 caused by the deceleration to recover the regenerative electric power. The recovered electric power is charged in the capacitor 20 through the inverter 10.

When the SOC of the capacitor 20 increases due to electric power generation of the motor generator 60 and exceeds the threshold value x3 set in the charge/discharge map of FIG. 2A (timing t8), the controller 50 performs control such that the electric power charged in the capacitor 20 is charged in the battery 40 through the electric power converter 30. Then, the vehicle stops (timing t9). In this case, after the vehicle stops, the capacitor 20 is fully charged. Therefore, the motor generator 60 can be operated using the electric power stored in the capacitor 20 in the next vehicle start.

By performing the control in this manner, the supply of electric power to the motor generator 60 and the charging of the generative electric power are performed using the capacitor 20 which is the first electric charger under control of the controller 100. Meanwhile, by complementarily performing charging/discharging between the capacitor 20 and the battery 40, which is the second electric charger provided separately from the capacitor 20, under control of the controller 50, it is possible to perform the supply of electric power to the motor generator 60 and the charging of the generative electric power beyond the characteristic of the capacitor 20.

In particular, when the electric power of the capacitor 20 is supplied to the motor generator 60, and the charging capacity of the capacitor 20 is short, the charging is performed from the battery 40, which is the second electric charger, to the capacitor 20, so that it is possible to drive the motor generator 60 beyond a lower limitation of the electric power storable in the capacitor 20. In addition, when the charging is performed from the motor generator 60 to the capacitor 20, and the charging capacity of the capacitor 20 reaches its upper limitation, the charging is performed from the capacitor 20 to the battery 40, so that it is possible to perform the charging beyond an upper limitation of the electric power storable in the capacitor 20. As a result, it is possible to effectively recover the regenerative electric power.

The capacitor 20 includes, for example, an electric double-layer capacitor. The capacitor 20 can perform charging/discharging with high frequency and high output power or in a deep cycle, but has a charging capacity per volume smaller than that of the battery 40. In comparison, the battery 40 can be charged with electric power more than that of the capacitor 20, but it is difficult to perform charging/discharging with high frequency and high output power or in a deep cycle.

According to an embodiment of this invention, due to the configuration and the control described above, the electric power charged in the capacitor 20 is used first when the motor generator 60 is driven. Since the capacitor 20 can perform the charging/discharging with high frequency and high output power or in a deep cycle, the capacitor 20 is used, for example, when large electric power is supplied within a short time, such as a start or acceleration, or when large regenerative electric power is charged within a short time, such as deceleration.

Meanwhile, since the capacitor 20 has a low upper limitation of storable electric power, the electric power charged in the capacitor 20 may be entirely consumed, for example, during acceleration. In this case, by performing the charging from the battery 40 to the capacitor 20, it is possible to drive the motor generator 60 beyond the capacity storable in the capacitor 20.

When the motor generator 60 generates electric power, the capacitor 20 is charged first. However, since the capacitor 20 has a low upper limitation of the storable electric power, the charging of the capacitor 20 may reach the upper limitation during deceleration. In this case, by performing the charging from the capacitor 20 to the battery 40, it is possible to recover the regenerative electric power of the motor generator 60 beyond the capacity storable in the capacitor 20.

Therefore, it is possible to perform a charging/discharging control without significantly increasing the capacities of the capacitor 20 and the battery 40. In particular, since it is not necessary to provide the battery 40 capable of charging/discharging with high frequency and high output power, it is possible to employ a battery 40 suitable for a particular use, for example, by increasing the capacity by suppressing the upper limitation of the output power. In addition, it is possible to reduce size and suppress cost. Furthermore, by reducing the size of the battery 40 and suppressing the weight, it is possible to improve fuel efficiency or loadability when such a battery 40 is mounted.

The controller 100 performs the driving and the electric power generation of the motor generator 60 using the capacitor 20 through the inverter 10. That is, although the charge/discharge system 1 comprises the capacitor 20 and the battery 40 that have different charge/discharge characteristics, it can be regarded as a system having only the capacitor 20 from the viewpoint of the inverter 10 and the controller 100 that controls them. In this configuration, for example, when a plurality of electric chargers having different charge/discharge characteristics are switchingly used as in the prior art, it is necessary to cause the inverter 10 or the controller 100 to switch the control. According to an embodiment of this invention, such switching is not necessary, and it is possible to perform the control robustly based on a single battery characteristic under control of the controller 50.

It is noted that, although the battery 40 is a lithium ion secondary battery according to an embodiment of this invention, other types of secondary batteries such as a lead storage battery or a nickel hydrogen battery may also be employed without any limitation. In addition, the capacitor 20 is not limited to the electric double-layer capacitor, and other types of capacitors such as a lithium ion capacitor may also be employed.

Embodiments of the this invention were described above, but above embodiments are merely examples of the applications of this invention, and the technical scope of the this invention is not limited to the specific constitutions of the above embodiments.

The invention claimed is:

1. A charge/discharge system comprising:
a motor generator adapted to serve as a driving power source for driving a vehicle and to perform electric power generation using power of the vehicle;
a capacitor adapted to supply electric power to the motor generator and to be charged by electric power generated by the motor generator;
a battery adapted to be charged by power from the capacitor and to discharge power to the capacitor, said capacitor connected to said motor generator and said battery, and said battery connected to said capacitor;
an electric power converter adapted to complementarily perform charging and discharging between the capacitor and the battery, the battery including a negative electrode separated from the capacitor by the electric power converter; and
a controller adapted to control operations of the motor generator and the electric power converter, wherein the controller is configured to implement the following modes:
a mode, during vehicle acceleration, in which the motor generator is driven with only electric power charged in the capacitor;
a mode, during vehicle acceleration, in which a charging capacity of the capacitor is equal to or lower than a first predetermined value and the motor generator is driven by charging the capacitor from electric power of the battery;
a mode, during a normal travel condition defined by a speed of the vehicle being substantially constant compared to a speed of the vehicle during the vehicle acceleration, in which the vehicle is driven only by an engine;
a mode during the normal travel condition in which the electric power charged in the capacitor is charged to the battery;
a mode during the normal travel condition in which the capacitor is charged by the motor generator;
a mode, during vehicle deceleration, in which the capacitor is charged by the motor generator; and
a mode, during vehicle deceleration, in which the electric power charged in the capacitor is charged to the battery when the charging capacity of the capacitor exceeds the second predetermined value;
wherein the controller:
obtains charging conditions of the capacitor and the battery,
controls the electric power converter based on at least one of charging conditions of the capacitor and the battery such that the electric power charged in the capacitor is charged in the battery, or the electric power charged in the battery is charged in the capacitor;
when the electric power charged in the capacitor charges to the battery, output power from the capacitor to the battery is set to decrease as the electric power charged in the capacitor approaches a predetermined charging state that restricts charging; and
when the electric power charged in the battery charges to the capacitor, output power from the battery to the capacitor is set to increase as the electric power charged in the battery approaches a predetermined charging state that starts charging.

2. The charge/discharge system according to claim 1, wherein the controller performs control based on the charging condition of the capacitor such that electric power charged in the capacitor is supplied to the motor generator, and electric power generated by the motor generator is charged in the capacitor.

3. The charge/discharge system according to claim 1, wherein the battery is a secondary battery.

4. The charge/discharge system according to claim 1, wherein the controller drives the vehicle using power from at least one of the motor generator and the engine, and the motor generator generates electric power using a driving force of the engine.

5. The charge/discharge system according to claim 1, wherein the controller is configured such that when the motor generator generates the electric power using the power of the vehicle, the electric power that is generated using the power of the vehicle charges the capacitor and the electric power charged in the capacitor charges the battery.

* * * * *